United States Patent [19]

O'Brien

[11] Patent Number: 5,619,327
[45] Date of Patent: Apr. 8, 1997

[54] TESTING A METAL COMPONENT FOR COLD COMPRESSION OF THE METAL

[75] Inventor: Edwin W. O'Brien, Bristol, Great Britain

[73] Assignee: British Aerospace Public Limited Company, Farnborough, United Kingdom

[21] Appl. No.: 403,441

[22] Filed: Mar. 14, 1995

[30] Foreign Application Priority Data

Mar. 19, 1994 [GB] United Kingdom ............... 9405457

[51] Int. Cl.$^6$ .................................................. G01B 9/02
[52] U.S. Cl. ................................. 356/359; 356/354
[58] Field of Search ............................ 356/359, 360, 356/354, 32, 35.5, 374; 73/800, 802

[56] References Cited

U.S. PATENT DOCUMENTS 4,794,550  12/1988  Grenenkamp, Jr. ................. 356/374

FOREIGN PATENT DOCUMENTS 1403013  8/1975  United Kingdom.
1582661  1/1981  United Kingdom.

Primary Examiner—Samuel A. Turner
Attorney, Agent, or Firm—Nixon & Vanderhye P.C.

[57] ABSTRACT

The invention provides a method of testing a metal component (1) for cold compression of the metal when used, for example for fatigue enhancement. The component defines a generally smooth surface (6) and includes a region (22), eg an aperture, subject to cold compression which breaks that surface in a given area. The method includes the steps of placing a moiré grid (13, 15) such that it is spaced from and coextends with the said area of the surface, directing a source of generally parallel light (16) through the grid (15), and at an oblique angle thereto, at the said area of the surface, and viewing the surface through the grid substantially normal to the surface whereby to observe any light interferences fringes (24) caused by eruption of the surface due to cold compression of the metal.

4 Claims, 2 Drawing Sheets

5,619,327

TESTING A METAL COMPONENT FOR COLD COMPRESSION OF THE METAL

BACKGROUND TO THE INVENTION

1. Field of the Invention

This invention relates to the testing of metal components for cold compression of the metal and finds particular use in the testing of metal plate or panels having apertures formed through them treatable for the prevention of fatigue crack propagation by cold expansion of the metal surrounding the apertures.

2. Description of the Prior Art

It is well known to provide fatigue enhancement of metal aircraft components having apertures in them. Such fatigue enhancement is obtained by "cold expansion" of the aperture by drawing an oversized mandrel through the aperture, usually with a split sleeve positioned between the mandrel and the wall of the aperture to avoid frictional interference between them.

The split sleeve method of cold expansion involves positioning a hardened sleeve with a split along its length over a tapered mandrel and positioning both inside the aperture. The tapered mandrel is then drawn through the split sleeve which is thereby expanded to provide a compressive stress in the metal surrounding the aperture. The aperture becomes permanently slightly enlarged. A permanent compressive stress zone is thereby created around the aperture made up of both plastic and elastic strains. The elastic component is what gives the fatigue protection and the plastic component causes the elastic component to be permanent.

Aperture expansion by the split sleeve method leaves a witness mark at the position of the sleeve split and a small volcano ridge around the exit side of the aperture on a surface of the component which the aperture breaks. These are clear indications that the aperture has been expanded. However, these marks, and ridges subsequently have to be removed by reaming and de-burring to enable fitting of a fastener into the aperture. Detection of the cold expansion process thereafter is thus rendered extremely difficult. It will be appreciated by those skilled in the art that in components where structural strength per unit weight is paramount, for example aircraft, and where the metal of the component has been worked to provide maximum strength, if for some reason this calculated strength is diminished then the component is liable to suffer early failure in service.

For some time a method of detecting whether such metal components have been cold worked after operations such as reaming and de-burring has been sought without success with the risk that unwanted crack propagation from fastening apertures in metal components such as aircraft wing structures has been known to occur due to fatigue loading in service.

OBJECT OF THE INVENTION

A simple and reliable method of detecting the presence or otherwise of cold compression of metal components is therefore sought.

SUMMARY OF THE INVENTION

According to the invention there is provided a method of testing a metal component for cold compression of the metal, the component defining a generally smooth surface and including a region subject to cold compression which breaks that surface in a given area, the method including the steps of placing a moiré grid such that it is spaced from and coextends with the said area of the surface, directing a source of generally parallel light through the grid, and at an oblique angle thereto, at the said area of the surface, and viewing the surface through the grid substantially normal to the surface whereby to observe any light interference fringes caused by eruption of the surface due to cold compression of the metal.

This method makes use of an effect known as Poisson's effect in which a mechanical strain applied to in particular a metal in one direction will cause a complementary strain, known as the Poisson's effect, at right angles to it. If the elastic limit of the material is exceeded the strain will become permanant. With cold expansion of apertures in metal components where radial expansion causes a thickening of the material surrounding the aperture, this thickening modifies the topography of a previously generally flat surface surrounding the aperture which thickening can be detected by the method of the invention even when de-burring of a lip of the aperture has taken place.

The moiré grid may be placed so as to coextend at a small included angle with the said area of the surface whereby to create carrier interference fringes, which may be generally parallel, for viewing by an observer to aid the distinguishing of the said surface eruption interference fringes.

The presence of such carrier fringes tends to highlight any interference fringes which are caused by the surface eruption which is to be detected.

Moiré grids are conveniently formed on one face of a glass plate. For applications where safety is paramount it may be necessary to use toughened glass.

Moiré grids with differing patterns can satisfactorily be used. With the use of very fine moiré grids and also so called photoelastic moiré grids comprising a series of mutually orthogonal grid lines it is possible to determine the level of applied cold compression to the metal for typical known materials, for example those used in aircraft construction. The degree of surface eruption is material dependent and dependent in addition on whether the entry or exit surface of the metal component is being viewed.

If the setting of the said included angle and the said oblique angle are to predetermined levels, for example by using micrometer clamping devices, then calculation of the height of any said surface eruption may be carried out to determine the extent of any cold compression of the metal. It has been found best to use very fine grids, for this purpose.

In a preferred version of the method according to the invention the region of cold compression of the metal surrounds an aperture defined through the component wherein the cold compression of the metal is caused by an expansive force applied to a wall defining the aperture.

In the event that carrying out the method on one said surface area of the component is inconclusive, resolution of the state of cold working of the aperture may be obtained by repeating the method of the invention on the reverse surface of the component which may not have been subject to the same surface flattening as the initial surface tested.

It may be found desirable in some circumstances to treat the said area of surface to enhance contrast of light and dark regions on it. This may conveniently be carried out by applying a generally white powder developer to the surface, for example Magnaflux SKD-NF (Trade Mark) white powder developer.

The source of generally parallel light may be obtained by passing unfocussed light through Huygen's slits. For some applications safety lamps may be required, eg the interiors of aircraft wing fuel tanks.

Where it is desired to test components which have already received a protective coating, for example paint, which may have occurred if the component has already developed fatigue cracks and it is desired to ascertain whether an aperture has been cold worked, it may be necessary as a preliminary step to remove the protective coating from the said area of surface.

Such removal may be carried out by using one or more solvents or alternatively by applying light abrasion to the coating, which has been found to leave the topography of the surface still in a state to reveal the presence, or absence of cold compression.

Although the invention is most often applicable to generally flat surfaces it may be used with equal effect on surfaces with relatively gentle curvature.

BRIEF DESCRIPTION OF THE DRAWINGS

The invention will now be described by way of example with reference to the accompanying drawings of which.

DESCRIPTION OF PREFERRED EMBODIMENT

Figure 1:
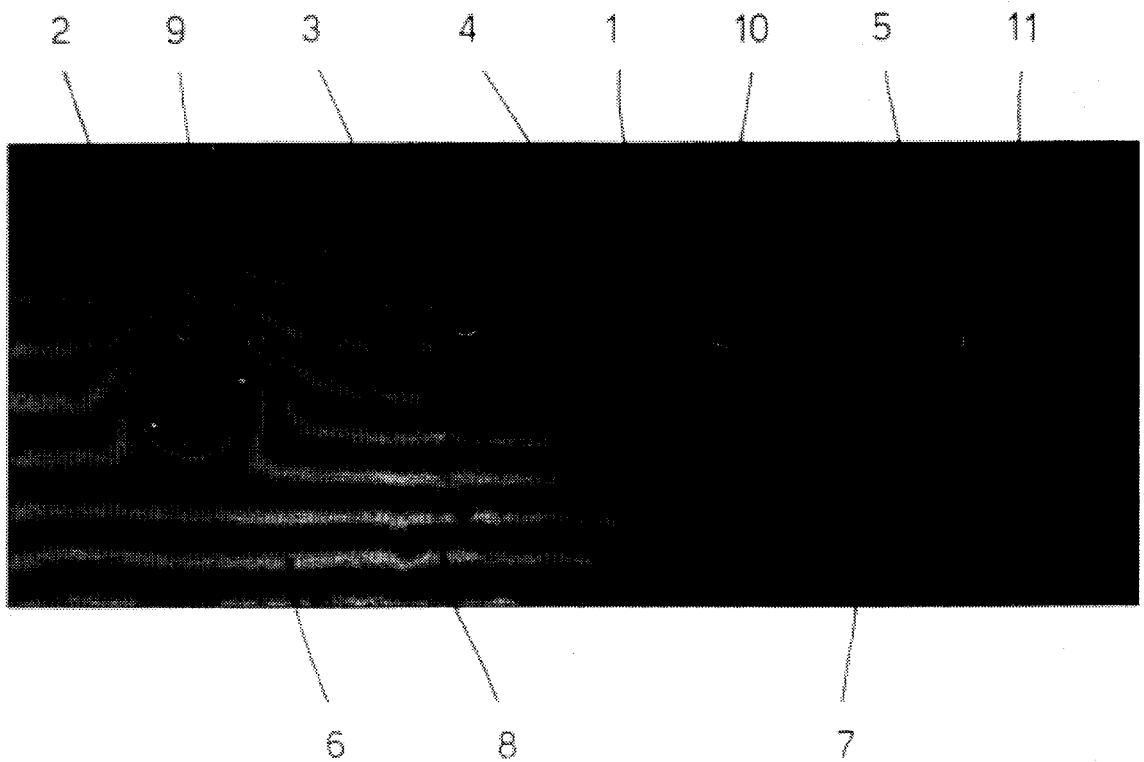
FIG. 1 is an interferograph of a moiré fringe pattern created over a metal plate having four drilled apertures one of which has not been cold expanded.

Referring to FIG. 1, a 2.5 centimeter thick plate 1 of metal alloy is shown in plan. The plate 1 has four apertures 2, 3, 4, 5 drilled in it of 2.5 centimeters diameter. Apertures 2, 4, and 5 have been cold expanded by a nominal 4%. Superimposed over an upper surface 6 of the plate are moiré interference fringes 7. The relatively straight fringes 8 are called carrier fringes and are created by supporting a moiré grid (not shown separately) at a small included angle above the upper surface 6 of the plate and coextending substantially parallel therewith. Around apertures 2, 4 and 5 can be seen distorted areas 9, 10, 11 in the fringe pattern. These distorted areas clearly show the moiré fringes produced by upward surface eruption surrounding the apertures induced by cold expansion of the apertures. This cold expansion causes a Poisson's effect to erupt the metal surrounding the aperture upwardly, even when de-burring of lips 23 of the apertures has taken place (see FIG. 2) the eruption due to the Poisson's effect remains.

From FIG. 1 it can readily be deduced therefore that aperture 3 has not been cold expanded as the carrier fringes extend uninterrupted over this aperture.

Figure 2:
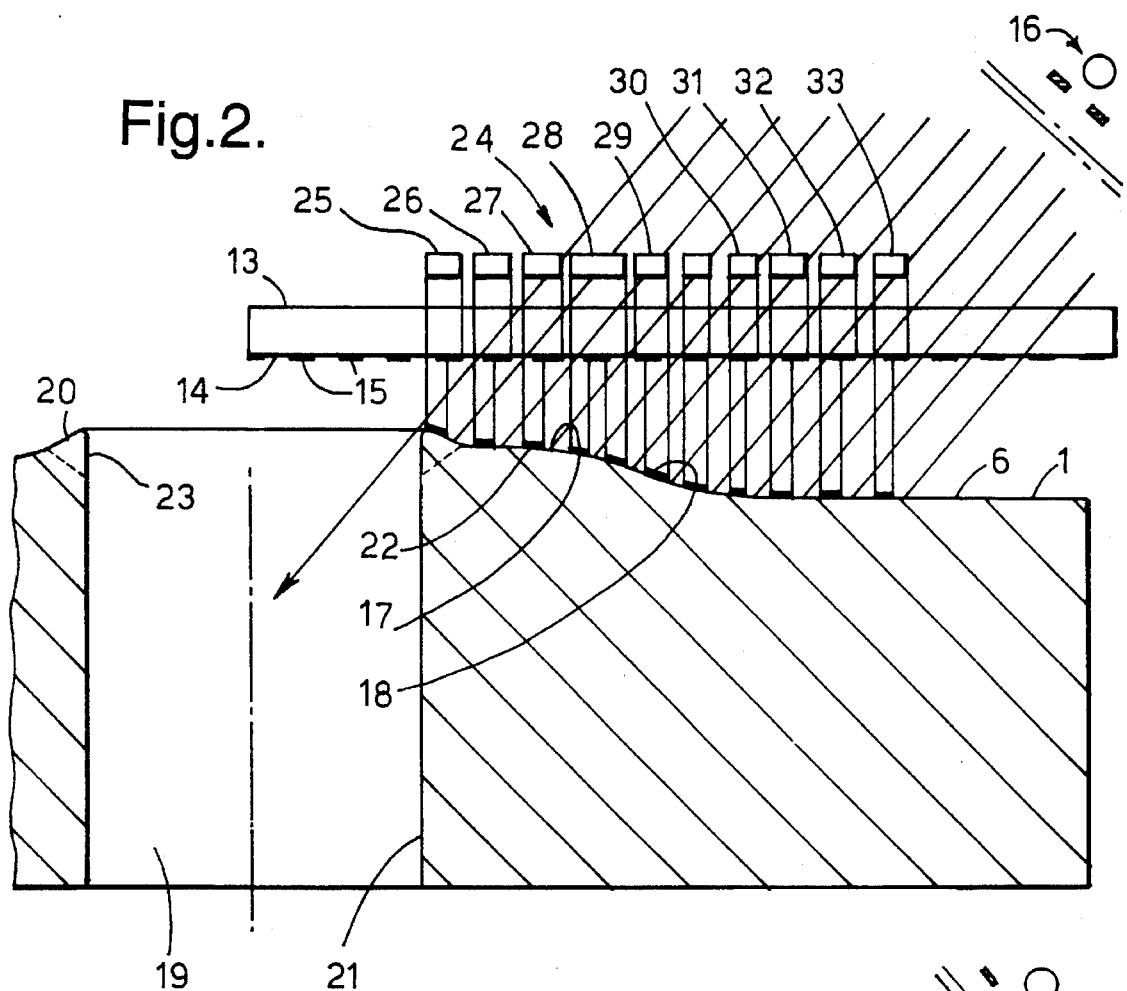
FIG. 2 is a diagrammatic vertical section through a drilled metal plate showing apparatus according to the invention for creating a moiré fringe pattern.

Referring to FIG. 2, a section through a plate 1 similar to that of FIG. 1 is shown. Positioned above an upper surface 6 of the plate is a sheet of glass 13 on an underside 14 of which has been marked a moiré grid 15 of parallel straight lines. The moiré grid coextends with the upper surface 6 of the plate substantially parallel to it. A collimated or organised light source 16 is positioned above the plate and shines generally parallel light onto the upper surface 6 of the plate through the moiré grid 15. Areas of light 17 and areas of shadow 18 appear on the upper surface 6 of the plate. It can be seen that the thickness of the plate is substantially constant save in a region surrounding an aperture 19. Surface eruption has been caused in this area owing to the action of Poisson's effect thickening the plate in the region of cold compression of the metal caused by expansion of the aperture during cold working. It will be seen that the greatest eruption is in a region 20 adjacent a bore 21 of the aperture. A region of reduced eruption 22 surrounds the region 20. This region 22 gradually diminishes with distance from the center line of the aperture. The dotted line in the region 20 denotes a region 23 which will be removed by de-burring of the aperture. It will be seen that once this region 23 or "lip" of metal has been removed the region of reduced eruption 22 will be much more difficult to detect, visually unaided. The effect of surface eruption has been greatly exaggerated in these drawings for purposes of clarity.

Shown at 24 is a pattern of interference fringes visible by an observer looking vertically down through the moiré grid onto the upper surface of the plate. When an observer views the upper surface 6 of the plate he will be unable to distinguish between lines of the moiré grid 15 and areas of shadow 18 on the upper surface of the plate. Continuous areas of moiré grid line and shadow will therefore appear as extended dark fringes 25, 26, 27, 28, 29, 30, 31, 32, 33. The width of each fringe is dependent upon the rate of change of surface topography. This can be seen from FIG. 1 where the generally flat surface elicits wide fringes 8 whereas the erupted surface surrounding the apertures 2, 4 & 5 creates much narrower fringes 9, 10, 11.

Figure 3:
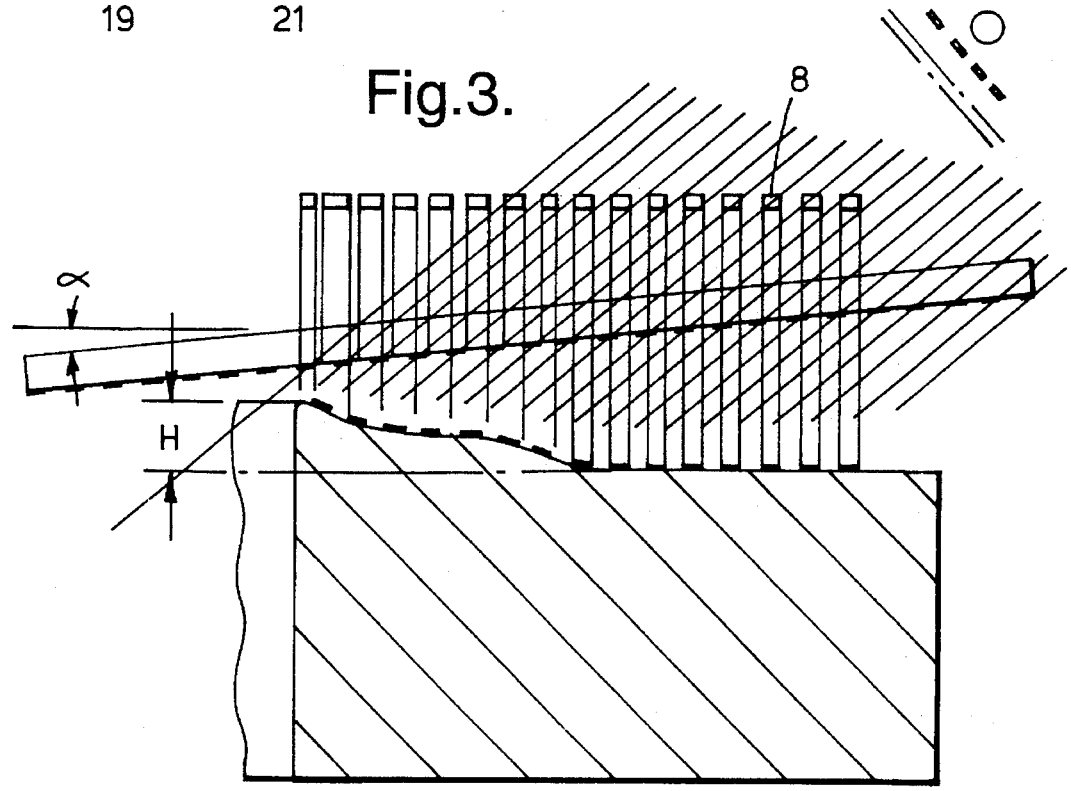
FIG. 3 shows the arrangement of FIG. 2 but with a moiré grid set at a predetermined angle to an upper surface of the plate.

FIG. 3 shows an arrangement similar to that of FIG. 2 but with the sheet of glass 13 of the moiré grid angled at an angle alpha to the upper surface 6 of the plate. The angle alpha is predetermined. The positioning of the sheet of glass at an angle in this way greatly increases the sensitivity of the apparatus of the invention owing to the interference effect on the fringes caused by the angling of the glass. Carrier fringes 8 are produced by this method which are visible when a relatively flat portion of the surface 34 is viewed. The width of these fringes is drastically altered by changes in the topography of the upper surface 6 of the plate, as can best be seen by viewing the fringes in the regions of the apertures in FIG. 1. The different fringe patterns as compared to the arrangement shown in FIG. 2 can be clearly seen in FIG. 3. The fringes are much narrower and changes in the width thereof are therefore much more easily detectable by the eye.

Positioning of the moiré grid at a predetermined angle to the surface of the plate can be used to calculate the height H of the surface eruption so long as the angle of incidence of light on the surface and the grid spacing of the moiré grid are known. In this way the degree of cold working of the metal can be ascertained in order to determine, say, whether an aperture has been expanded by four or six percent. Different degrees of expansion are often required for different applications.

Figure 4:
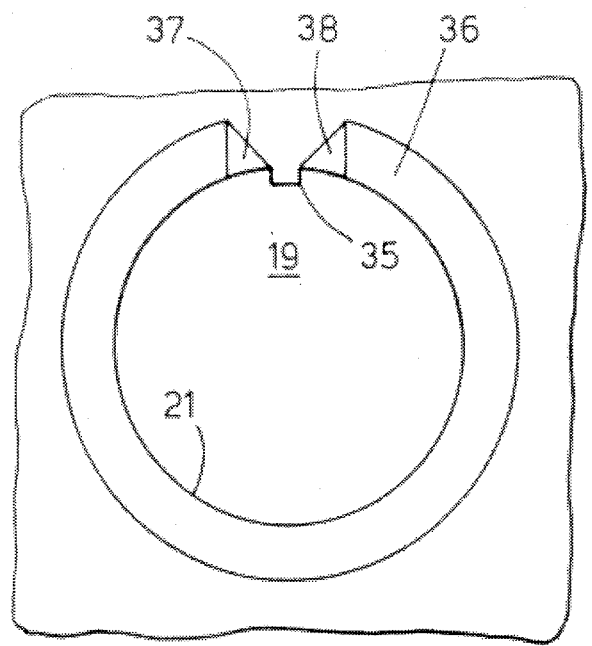
FIG. 4 is a diagrammatic plan view of a cold expanded aperture in a metal plate showing Poisson's effect surrounding the aperture.

FIG. 4 shows generally the surface eruption due to Poisson's effect surrounding an aperture 19. A "pip" 35 left by a split sleeve (now shown) during cold expansion drastically alters the Poisson's effect 36 in the region of the pip. Two areas 37, 38 adjacent the pip 35 display additional eruption owing to the discontinuity in the cold compression of the metal.

I claim:

1. A method of testing a metal component for cold compression of the metal, the component defining a generally smooth surface and including a region subject to cold compression which breaks that surface in a given area, the method including the steps of:

placing a moiré grid such that it is spaced from and coextends at a small included angle with said area of the surface creating generally parallel carrier interference fringes for viewing by an observer to aid the distinguishing of the said surface eruption interference fringes, directing a source of generally parallel light through the grid, and at an oblique angle thereto, at said area of the surface, and viewing the surface through the grid substantially normal to the surface in order to observe any light interference fringes caused by eruption of the surface, due to cold compression of the metal.

2. A method as in claim 1 in which the region of cold compression of the metal surrounds an aperture defined through the component wherein the cold compression of the metal is caused by an expansive force applied to a wall defining the aperture.

3. A method as in claim 1 in which the said area of surface is treated to enhance contrast of light and dark regions thereupon.

4. A method as in claim 1 in which the source of generally parallel light is obtained by passing unfocussed light through Huygen's slits.

* * * * *